(No Model.)
J. W. GREENE.
ANIMAL TRAP.
No. 590,756. Patented Sept. 28, 1897.
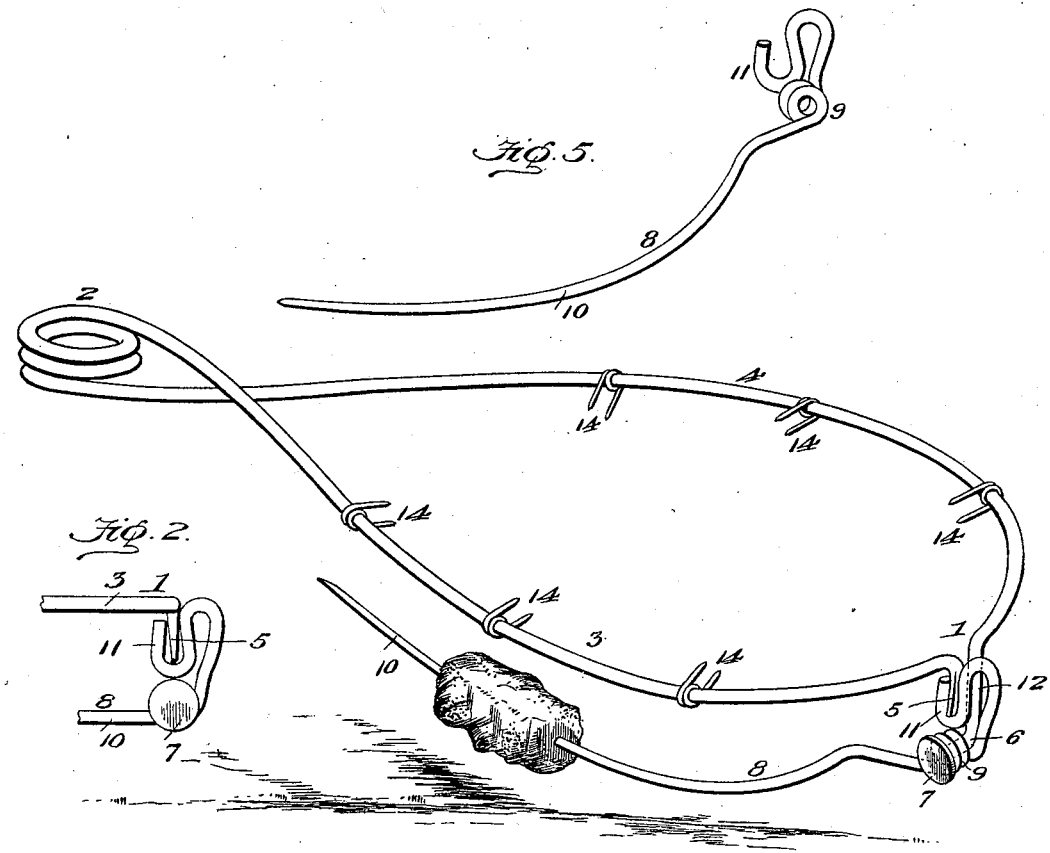
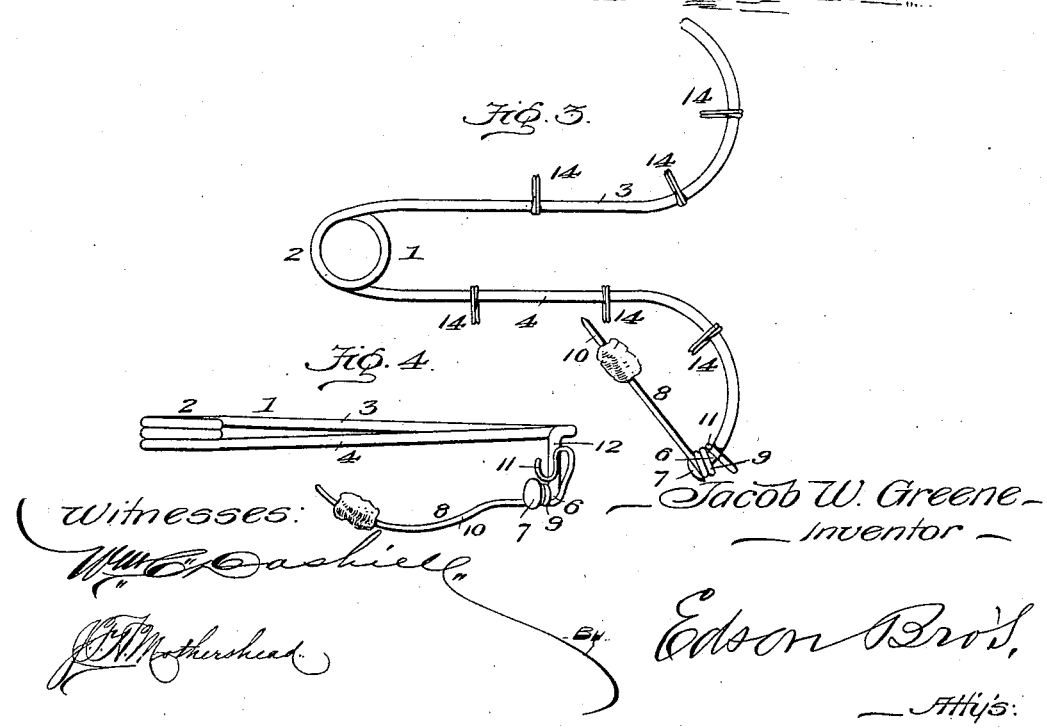
Jacob W. Greene — Inventor —

UNITED STATES PATENT OFFICE.

JACOB W. GREENE, OF TRENTON, MISSOURI.

ANIMAL-TRAP.

SPECIFICATION forming part of Letters Patent No. 590,756, dated September 28, 1897.

Application filed June 29, 1897. Serial No. 642,856. (No model.)

*To all whom it may concern:*

Be it known that I, JACOB W. GREENE, a citizen of the United States, residing at Trenton, in the county of Grundy and State of Missouri, have invented certain new and useful Improvements in Animal-Traps; and I do hereby declare the following to be a full, clear, and exact description of the invention, such as will enable others skilled in the art to which it appertains to make and use the same.

My invention relates to improvements in animal-traps of that class known to those skilled in the art as "choker-traps" from the fact that they are designed to kill the animal by strangulation, but while the trap is of this general nature I have also embraced in its construction means for impaling the animal, so as to bleed it, thus making the trap embody the features of choking and impalement.

The improvement is designed for catching all kinds of small animals, but it is especially useful for entrapping hares or rabbits.

In my improved trap I have embraced a novel construction of the jaws and trigger mechanism with a view to promoting the efficiency of the trap, facilitate and render easy its setting or adjustment, and to insuring its prompt response to a slight movement of the trigger to quickly spring the trap or close its jaws when an attempt is made to grasp or dislodge the bait on the trigger.

The first part of my invention consists in a novel construction of the jaws and the trigger mechanism, in which the trigger is arranged to act as a lever to free the jaws and to throw their interlocking ends past one another.

The invention further consists in a novel manner of mounting the trigger on one of the jaws of the trap; and it consists, finally, in the construction and combination of parts, which will be hereinafter fully described and claimed.

To enable others to understand my invention, I have illustrated the same in the accompanying drawings, forming a part of this specification, and in which—

Figure 1 is a perspective view of my improved animal-trap, showing it set ready for operation. Fig. 2 is a view in side elevation showing the manner of engaging the trigger with one of the jaws when the trap is set. Fig. 3 is a plan view of the trap when sprung. Fig. 4 is an edge view of the trap in the sprung position shown by Fig. 3. Fig. 5 is a detail perspective view of the trigger.

Like numerals of reference denote corresponding parts in all the figures of the drawings, referring to which—

1 designates the trap in its entirety. I prefer to make the trap from stout spring-wire and in a single continuous piece except for the trigger and possibly the impalement-barbs; but I do not restrict my invention to making the jaws of the trap in a piece of wire, because the trap may be made in any other appropriate manner to secure the functions contemplated by my invention. In making the major portion of the trap from spring-wire, as shown by the drawings, I first proceed to bend the wire at its middle to form the coil 2 and then bend the ends of the wire in opposite directions to produce the two jaws 3 4, which are curved reversely to each other and arranged to lie in different planes, so as to partially cross one another.

The jaw 3 of the trap has its extremity remote from the coil bent to form an angular locking-nib 5. The nib stands at a right angle to the length of the curved jaw, and the nib is made with angular faces or sides, being preferably tapered slightly from the jaw to the extremity thereof, whereby the locking-nib is given a form which makes it better adapted to engage and to remain in engagement with the trigger. The other jaw 4 of the trap has its extremity remote from the spring-coil 2 bent at a right angle to the length of the jaw 4 to form a post or arm 12, and this right-angled end 12 is again bent at a right angle to form the pintle 6. This pintle projects from the upright angular bend or post 12 of the jaw 4, and it is in a plane parallel to that of the jaw 4, with which it is connected. The extremity of the pintle has a head 7 or other suitable enlargement to prevent the trigger from being displaced on the pintle.

The trigger 8 is mounted on this pintle 6, so as to be carried by the jaw 4 of the trap, and this trigger is peculiarly constructed to engage with the locking-nib 5 of the other jaw 3, whereby the trigger serves to hold the jaws of the trap in their spread-open or "set" positions. I prefer to make this trigger 8 of a single piece of wire, and to this end I bend the trigger at an intermediate point of its length to produce the eye 9, by which the trigger is loosely mounted on the pintle 6 of the jaw 4. One end of the trigger is extended from the eye 9 in the form of a long arm 10, preferably curved, as shown, and flattened or made angular toward its extremity for the purpose of holding the bait securely thereon, so that the bait cannot be turned easily on the trigger and pulled off or displaced therefrom. The other end of the trigger, beyond the pivotal eye, is bent peculiarly, as has been indicated heretofore, to provide the detent by which the trigger may be engaged with the locking-nib 5, and by which said trigger is caused to serve as a lever in spreading the jaws preparatory to allowing the recoil of the spring to force them together or "spring" the trap to choke and impale the animal which may be caught therein. This short end of the wire trigger is bent and extended beyond the eye 9 and is then doubled upon itself and formed into an open loop 11, which constitutes the detent, in the loop of which the angular locking-nib 5 may be fitted.

In setting or adjusting the trap for service the jaws are pulled apart against the tension of the coil 2, which constitutes the spring, and the angular nib 5 of the jaw 3 is carried past and beyond the angular post or arm 12, formed by the bend on the jaw 4. The locking-nib 5 is arranged to bear against the post 12 and to fit within the loop-shaped detent 11 of the trigger, whereby the trigger is engaged with the locking-nib 5 of the jaw 3, and said nib also bears against the short post or arm 12 of the jaw 4, on which the trigger is mounted. The trigger occupies a horizontal position below the plane of the jaws of the trap, and said trigger extends from the point of temporary union of the jaws over the central part of the trap between and below the jaws thereof, as shown by Fig. 1. When an animal thrusts its head between the jaws to grasp the bait on the trigger, the latter is turned on the pintle 6 to throw its loop-shaped detent 11 outwardly and move the locking-nib 5 of the jaw 4 in the same direction to clear the post 12 of the jaw 4, and thus the jaws are disengaged by the trigger in a manner to allow the recoil of the spring-coil 2 to force the jaws quickly together and catch the animal around the neck to choke and kill it.

While the trigger and jaws are so constructed that they will be promptly and quickly disengaged when the bait is pushed or pulled at on the long arm 10 of the trigger, the engagement of the nib 5 with the loop-shaped detent of the trigger prevents to a great extent the premature springing of the trap and the accidental catching of the operator's hand or fingers between the jaws of the trap.

Along the jaws 3 4, at suitable intervals thereon, I have provided the impalement-barbs 14, which consist of sharp-pointed wires extending inwardly from the jaws and adapted to stab and impale the animal when the jaws are forced together. The barbs thus bleed the animal, to aid in its extinction more quickly than the strangling due to the action of the choker-jaws, and this is advantageous when the animal is to be eaten as food. The barbs may consist of short wires twisted around the jaws or soldered thereto, or nails, but the detailed construction of the barbs is not material.

The jaws of the trap adjacent to their juncture with the coil 2 are curved abruptly, so as to cross each other adjacent to the coil to enable the jaws to close and lock together when the trap is sprung, due to the fact that the jaws cross each other adjacent to the coil, so that the more the animal pulls on the jaws in efforts to free itself the tighter it will be held by and between the jaws.

The peculiar form of the detent in my trigger effects two purposes—namely, to steady the jaw 3 against the jaw 4 when the trap is set, so as to prevent the jaws from slipping past each other too easily, and to spread the jaws or to force the nib 5 back of and out of the path of the post 12 when the jaws are forced together by the springing of the trap.

The barbs on the choker-jaws of the trap enable me to construct the same of lighter material without impairing its efficiency. I found in constructing traps without the impalement-barbs that it was necessary to use stout wire, which renders the trap unwieldy to handle and difficult of adjustment, but by the use of the impalement-barbs the animal is instantly killed instead of being strangled by the choking action of the jaws.

In use I place the trap mainly over a small hole made for the purpose in the ground or snow, but it may be used over any hole or passway through which the animal is wont to go or come. When a hole is dug to receive the trap, it is made somewhat larger than the trap. Two or three pegs or nails are then inserted in the bank of the hole near its top or mouth, and the trap in its baited and set condition is then placed on these supports. The hole should be five or six inches deep, but the trap should rest on the pegs near its top or mouth. This prevents the trap from slipping sidewise and from letting the animal's feet catch in the trap as it reaches over and downward to secure the bait on the trigger.

The trap should be anchored to a stake, bush, or other object by a cable or chain to prevent the animal in its struggles from carrying off the trap.

While the trap may be used in various ways, I prefer to use it by setting it in a hole in the manner indicated, but it should not in this case be placed directly in the path of the animal, but to one side of its habitual path. The animal should be tolled to the trap by scattering a small quantity of bait in radial directions from the trap for short distances, so as to induce the animal to gradually approach the trap.

I may use a double wire to form the long arm 10 of the trigger.

It is thought that the operation and advantages of my invention will be readily understood from the foregoing description, taken in connection with the drawings.

I am aware that changes and alterations in the form and proportions of parts and in the details of construction of the device herein shown and described as the preferred embodiment of my invention may be made by a skilled mechanic without departing from the spirit or sacrificing the advantages thereof, and I therefore reserve the right to make such modifications as fairly fall within the scope of my invention.

Having thus fully described my invention, what I claim as new, and desire to secure by Letters Patent, is—

1. An animal-trap having jaws connected by a coil and arranged in different planes to move one past the other under the impelling influence of the spring, a post carried by one jaw at its free end, a locking-nib carried by the free end of the other jaw, and a trigger mounted on said post and arranged to engage operatively with said locking-nib, as and for the purposes described.

2. An animal-trap comprising the jaws connected by a coil and arranged in different planes to move past one another, barbs on the opposing faces of the jaws and arranged in such relation to the jaws as to insure the desired play or movement thereof, a post carried by one jaw, a locking-nib on the free end of the other jaw, and a trigger mounted on said post and having a detent with which the locking-nib is adapted to engage, as and for the purposes described.

3. In an animal-trap, the combination with a jaw bent to form a post, and another jaw provided with a locking-nib, of a wire trigger coiled to form an eye, an angular detent, and an extended bait-arm, said trigger being pivotally attached by fitting its eye on the post and arranged to have its detent engage with the locking-nib of one of the jaws, substantially as described.

4. An animal-trap comprising two jaws, one having a post, and the other an angular locking-nib, and a trigger pivoted on said post and having a loop-shaped detent into which the locking-nib may fit when the jaws are opened to adjust said nib against the post, substantially as described.

5. An animal-trap formed of wire to produce the coil and the curved jaws, said jaws adjacent to the coil being bent to cross each other, and one jaw provided with a post and the other with a locking-nib, combined with a trigger having a loop-shaped detent, substantially as described.

In testimony whereof I affix my signature in presence of two witnesses.

JACOB W. GREENE.

Witnesses:
J. E. CARTER,
R. W. HOSOM.